(12) United States Patent
Teng et al.

(10) Patent No.: US 8,238,876 B2
(45) Date of Patent: Aug. 7, 2012

(54) NOTIFICATIONS

(75) Inventors: Stephanie E. Teng, Seattle, WA (US);
Jinsheng Shi, Redmond, WA (US);
Albert Shen, Seattle, WA (US); Ryan M. Haning, Issaquah, WA (US); Paula Guntaur, Redmond, WA (US); Michael J. Kruzeniski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 12/414,382

(22) Filed: Mar. 30, 2009

(65) Prior Publication Data

US 2010/0248688 A1    Sep. 30, 2010

(51) Int. Cl.
*H04M 1/66*    (2006.01)
(52) U.S. Cl. ........................................ 455/411; 455/566
(58) Field of Classification Search .................. 455/411, 455/457, 404.2, 466, 566, 158.5, 414.1
See application file for complete search history.

(56) References Cited

U.S. PATENT DOCUMENTS

| | | | |
|---|---|---|---|
| 5,189,732 A | 2/1993 | Kondo | |
| 5,258,748 A | 11/1993 | Jones | |
| 5,463,725 A | 10/1995 | Henckel et al. | |
| 5,515,495 A | 5/1996 | Ikemoto | |
| 5,574,836 A | 11/1996 | Broemmelsiek | |
| 5,675,329 A | 10/1997 | Barker | |
| 5,905,492 A | 5/1999 | Straub et al. | |
| 5,914,720 A | 6/1999 | Maples et al. | |
| 5,963,204 A | 10/1999 | Ikeda et al. | |
| 6,008,816 A | 12/1999 | Eisler | |
| 6,396,963 B2 | 5/2002 | Shaffer | |
| 6,424,338 B1 | 7/2002 | Andersone | |
| 6,507,643 B1 | 1/2003 | Groner | |
| 6,662,023 B1 | 12/2003 | Helle | |
| 6,784,925 B1 | 8/2004 | Tomat | |
| 6,865,297 B2 | 3/2005 | Loui | |
| 6,876,312 B2 | 4/2005 | Yu | |
| 6,904,597 B2 | 6/2005 | Jin | |
| 6,961,731 B2 | 11/2005 | Holbrook | |
| 6,983,310 B2 | 1/2006 | Rouse | |
| 6,987,991 B2 | 1/2006 | Nelson | |
| 7,013,041 B2 | 3/2006 | Miyamoto | |
| 7,058,955 B2 | 6/2006 | Porkka | |
| 7,065,385 B2 | 6/2006 | Jarrad et al. | |
| 7,065,386 B1 | 6/2006 | Smethers | |

(Continued)

FOREIGN PATENT DOCUMENTS

CN             102197702        9/2011

(Continued)

OTHER PUBLICATIONS

"International Search Report", Application No. PCT/US2010/028553, Application Filing Date: Mar. 24, 2010, (Nov. 9, 2010), 9 pages.

(Continued)

*Primary Examiner* — Cong Tran
(74) *Attorney, Agent, or Firm* — Wolfe-SBMC

(57) ABSTRACT

Notification techniques are described. In an implementation, an unlock screen is displayed by a mobile communications device that indicates that one or more keys of the mobile communications device are locked. If an input is detected at the mobile communications device to remove the lock, an animation is displayed that gives an appearance that the unlock screen is a page that is being turned and removing the lock of the one or more keys.

15 Claims, 14 Drawing Sheets

U.S. PATENT DOCUMENTS

| | | |
|---|---|---|
| 7,111,044 B2 | 9/2006 | Lee |
| 7,133,707 B1 | 11/2006 | Rak |
| 7,133,859 B1* | 11/2006 | Wong ..................................... 1/1 |
| 7,139,800 B2 | 11/2006 | Bellotti et al. |
| 7,158,123 B2 | 1/2007 | Myers |
| 7,178,111 B2 | 2/2007 | Glein et al. |
| 7,216,588 B2 | 5/2007 | Suess |
| 7,249,326 B2 | 7/2007 | Stoakley et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,336,263 B2 | 2/2008 | Valikangas |
| 7,369,647 B2 | 5/2008 | Gao et al. |
| 7,388,578 B2 | 6/2008 | Tao |
| 7,403,191 B2 | 7/2008 | Sinclair |
| 7,447,520 B2 | 11/2008 | Scott |
| 7,479,949 B2 | 1/2009 | Jobs |
| 7,480,870 B2 | 1/2009 | Anzures |
| 7,483,418 B2 | 1/2009 | Maurer |
| 7,496,830 B2 | 2/2009 | Rubin |
| 7,610,563 B2 | 10/2009 | Nelson et al. |
| 7,619,615 B1 | 11/2009 | Donoghue |
| 7,640,518 B2 | 12/2009 | Forlines et al. |
| 7,657,849 B2* | 2/2010 | Chaudhri et al. ............. 715/863 |
| 7,671,756 B2* | 3/2010 | Herz et al. .................... 340/669 |
| 7,755,674 B2 | 7/2010 | Kaminaga |
| 7,834,861 B2 | 11/2010 | Lee |
| 7,877,707 B2 | 1/2011 | Westerman et al. |
| 7,889,180 B2 | 2/2011 | Byun et al. |
| 8,006,276 B2 | 8/2011 | Nakagawa et al. |
| 8,086,275 B2 | 12/2011 | Wykes |
| 8,175,653 B2 | 5/2012 | Smuga et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0060701 A1 | 5/2002 | Naughton et al. |
| 2002/0070961 A1 | 6/2002 | Xu et al. |
| 2002/0128036 A1 | 9/2002 | Yach et al. |
| 2002/0129061 A1 | 9/2002 | Swart et al. |
| 2002/0142762 A1 | 10/2002 | Chmaytelli et al. |
| 2002/0154176 A1 | 10/2002 | Barksdale et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0040300 A1 | 2/2003 | Bodic |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0222907 A1 | 12/2003 | Heikes et al. |
| 2003/0225846 A1 | 12/2003 | Heikes et al. |
| 2004/0078299 A1 | 4/2004 | Down-Logan |
| 2004/0111673 A1 | 6/2004 | Bowman et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0250217 A1 | 12/2004 | Tojo et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1* | 4/2005 | Kokko et al. ................. 455/566 |
| 2005/0085215 A1 | 4/2005 | Kokko |
| 2005/0085272 A1 | 4/2005 | Anderson et al. |
| 2005/0114788 A1 | 5/2005 | Fabritius |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0216300 A1 | 9/2005 | Appelman et al. |
| 2005/0232166 A1 | 10/2005 | Nierhaus |
| 2005/0250547 A1 | 11/2005 | Salman et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0015812 A1 | 1/2006 | Cunningham |
| 2006/0026013 A1 | 2/2006 | Kraft |
| 2006/0059430 A1 | 3/2006 | Bells |
| 2006/0074771 A1 | 4/2006 | Kim |
| 2006/0103623 A1 | 5/2006 | Davis |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0199598 A1 | 9/2006 | Lee et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294396 A1 | 12/2006 | Witman |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0054679 A1* | 3/2007 | Cho et al. ...................... 455/466 |
| 2007/0067272 A1 | 3/2007 | Flynt |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0127638 A1 | 6/2007 | Doulton |
| 2007/0157089 A1 | 7/2007 | Van Os et al. |
| 2007/0171192 A1 | 7/2007 | Seo et al. |
| 2007/0182595 A1 | 8/2007 | Ghasabian |
| 2007/0185847 A1 | 8/2007 | Budzik et al. |
| 2007/0192707 A1 | 8/2007 | Maeda et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0225022 A1 | 9/2007 | Satake |
| 2007/0233654 A1 | 10/2007 | Karlson |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0262964 A1 | 11/2007 | Zotov et al. |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0032681 A1 | 2/2008 | West |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1* | 3/2008 | Forstall et al. ................. 455/415 |
| 2008/0076472 A1 | 3/2008 | Hyatt |
| 2008/0082934 A1 | 4/2008 | Kocienda et al. |
| 2008/0085700 A1 | 4/2008 | Arora |
| 2008/0102863 A1 | 5/2008 | Hardy |
| 2008/0114535 A1 | 5/2008 | Nesbitt |
| 2008/0132252 A1 | 6/2008 | Altman et al. |
| 2008/0155425 A1 | 6/2008 | Murthy et al. |
| 2008/0165132 A1 | 7/2008 | Weiss |
| 2008/0165136 A1 | 7/2008 | Christie et al. |
| 2008/0165163 A1 | 7/2008 | Bathiche |
| 2008/0167058 A1 | 7/2008 | Lee et al. |
| 2008/0168403 A1 | 7/2008 | Westerman et al. |
| 2008/0172609 A1 | 7/2008 | Rytivaara |
| 2008/0180399 A1 | 7/2008 | Cheng |
| 2008/0182628 A1 | 7/2008 | Lee et al. |
| 2008/0189658 A1 | 8/2008 | Jeong et al. |
| 2008/0198141 A1 | 8/2008 | Lee et al. |
| 2008/0208973 A1 | 8/2008 | Hayashi |
| 2008/0222560 A1 | 9/2008 | Harrison |
| 2008/0222569 A1 | 9/2008 | Champion |
| 2008/0242362 A1 | 10/2008 | Duarte |

| | | | | | | |
|---|---|---|---|---|---|---|
| 2008/0259042 | A1 | 10/2008 | Thorn | KR | 200303655 | 2/2003 |
| 2008/0261660 | A1 | 10/2008 | Huh et al. | KR | 20060019198 | 3/2006 |
| 2008/0270558 | A1 | 10/2008 | Ma | KR | 1020070036114 | 4/2007 |
| 2008/0297475 | A1 | 12/2008 | Woolf et al. | KR | 1020070098337 | 10/2007 |
| 2008/0301046 | A1 | 12/2008 | Martinez | KR | 20070120368 | 12/2007 |
| 2008/0301575 | A1 | 12/2008 | Fermon | KR | 1020080025951 | 3/2008 |
| 2008/0309626 | A1 | 12/2008 | Westerman et al. | KR | 1020080076390 | 8/2008 |
| 2008/0316177 | A1 | 12/2008 | Tseng | KR | 100854333 | 9/2008 |
| 2008/0317240 | A1 | 12/2008 | Chang et al. | KR | 102008008415 | 9/2008 |
| 2009/0007017 | A1 | 1/2009 | Anzures et al. | KR | 1020080113913 | 12/2008 |
| 2009/0012952 | A1 | 1/2009 | Fredriksson | KR | 1020090041635 | 4/2009 |
| 2009/0029736 | A1 | 1/2009 | Kim et al. | TW | 201023026 | 6/2010 |
| 2009/0037469 | A1 | 2/2009 | Kirsch | WO | WO-2005026931 | 3/2005 |
| 2009/0051671 | A1 | 2/2009 | Konstas | WO | WO-2005027506 | 3/2005 |
| 2009/0061948 | A1 | 3/2009 | Lee et al. | WO | WO-2006019639 | 2/2006 |
| 2009/0064055 | A1 | 3/2009 | Chaudhri | WO | WO-2007121557 | 11/2007 |
| 2009/0077649 | A1 | 3/2009 | Lockhart | WO | WO-2007134623 | 11/2007 |
| 2009/0083656 | A1 | 3/2009 | Dokhon | WO | WO-2008030608 | 3/2008 |
| 2009/0085851 | A1 | 4/2009 | Lim | WO | WO-2008031871 | 3/2008 |
| 2009/0085878 | A1 | 4/2009 | Heubel | WO | WO-2008035831 | 3/2008 |
| 2009/0089215 | A1 | 4/2009 | Newton | WO | WO-2009000043 | 12/2008 |
| 2009/0109243 | A1 | 4/2009 | Kraft | WO | WO-2009049331 | 4/2009 |
| 2009/0117942 | A1 | 5/2009 | Boningue et al. | WO | WO-2010048229 | 4/2010 |
| 2009/0140061 | A1* | 6/2009 | Schultz et al. ............ 236/51 | WO | WO-2010048448 | 4/2010 |
| 2009/0140986 | A1 | 6/2009 | Karkkainen et al. | WO | WO-2010048519 | 4/2010 |
| 2009/0153492 | A1 | 6/2009 | Popp | WO | WO-2010117643 | 10/2010 |
| 2009/0160809 | A1 | 6/2009 | Yang | WO | WO-2010135155 | 11/2010 |
| 2009/0163182 | A1 | 6/2009 | Gatti et al. | | | |
| 2009/0164888 | A1 | 6/2009 | Phan | | | |
| 2009/0205041 | A1* | 8/2009 | Michalske ............ 726/17 | | | |
| 2009/0228825 | A1 | 9/2009 | Van Os et al. | | | |
| 2009/0265662 | A1 | 10/2009 | Bamford | | | |
| 2009/0284482 | A1 | 11/2009 | Chin | | | |
| 2009/0298547 | A1 | 12/2009 | Kim et al. | | | |
| 2009/0307589 | A1 | 12/2009 | Inose et al. | | | |
| 2009/0307623 | A1 | 12/2009 | Agarawala et al. | | | |
| 2009/0313584 | A1 | 12/2009 | Kerr et al. | | | |
| 2009/0315847 | A1 | 12/2009 | Fujii | | | |
| 2010/0008490 | A1 | 1/2010 | Gharachorloo et al. | | | |
| 2010/0075628 | A1* | 3/2010 | Ye ............ 455/404.2 | | | |
| 2010/0079413 | A1 | 4/2010 | Kawashima et al. | | | |
| 2010/0087169 | A1 | 4/2010 | Lin | | | |
| 2010/0087173 | A1 | 4/2010 | Lin | | | |
| 2010/0100839 | A1 | 4/2010 | Tseng et al. | | | |
| 2010/0103124 | A1 | 4/2010 | Kruzeniski | | | |
| 2010/0105370 | A1 | 4/2010 | Kruzeniski | | | |
| 2010/0105424 | A1 | 4/2010 | Smuga | | | |
| 2010/0105438 | A1 | 4/2010 | Wykes | | | |
| 2010/0105439 | A1 | 4/2010 | Friedman | | | |
| 2010/0105440 | A1 | 4/2010 | Kruzeniski | | | |
| 2010/0105441 | A1 | 4/2010 | Voss | | | |
| 2010/0107067 | A1 | 4/2010 | Vaisanen | | | |
| 2010/0107068 | A1 | 4/2010 | Butcher | | | |
| 2010/0107100 | A1 | 4/2010 | Schneekloth | | | |
| 2010/0145675 | A1* | 6/2010 | Lloyd et al. ............ 704/8 | | | |
| 2010/0159966 | A1 | 6/2010 | Friedman | | | |
| 2010/0159994 | A1* | 6/2010 | Stallings et al. ............ 455/566 | | | |
| 2010/0159995 | A1* | 6/2010 | Stallings et al. ............ 455/566 | | | |
| 2010/0167699 | A1 | 7/2010 | Sigmund et al. | | | |
| 2010/0180233 | A1 | 7/2010 | Kruzeniski et al. | | | |
| 2010/0216491 | A1* | 8/2010 | Winkler et al. ............ 455/457 | | | |
| 2010/0248689 | A1 | 9/2010 | Teng | | | |
| 2010/0248741 | A1* | 9/2010 | Setlur et al. ............ 455/456.1 | | | |
| 2010/0248787 | A1 | 9/2010 | Smuga | | | |
| 2010/0295795 | A1 | 11/2010 | Wilairat | | | |
| 2010/0311470 | A1 | 12/2010 | Seo et al. | | | |
| 2010/0321403 | A1 | 12/2010 | Inadome | | | |
| 2011/0018806 | A1 | 1/2011 | Yano | | | |
| 2011/0055773 | A1 | 3/2011 | Agarawala et al. | | | |
| 2011/0093778 | A1 | 4/2011 | Kim et al. | | | |
| 2011/0231796 | A1 | 9/2011 | Vigil | | | |
| 2012/0028687 | A1 | 2/2012 | Wykes | | | |
| 2012/0050185 | A1* | 3/2012 | Davydov et al. ............ 345/173 | | | |

FOREIGN PATENT DOCUMENTS

| | | |
|---|---|---|
| EP | 0583060 | 2/1994 |
| EP | 1752868 | 2/2007 |
| JP | 2004227393 | 8/2004 |
| JP | 2004357257 | 12/2004 |

OTHER PUBLICATIONS

"PCT Search Report and Written Opinion", Application No. PCT/US2010/034772, (Dec. 29, 2010), 12 pages.

"PCT Search Report and Written Opinion", PCT Application No. PCT/US2010/038730, (Jan. 19, 2011), 8 pages.

"PCT Search Report and Written Opinion", Application No. PCT/US2009/061382, (May 26, 2010), 10 pages.

"PCT Search Report and Written Opinion", Application No. PCT/US2009/061735, (Jun. 7, 2010), 11 pages.

"Microsoft Internet Explorer Window.Createpopup( ) Method Creates Chromeless Windows", Retrieved from:<http://www.addict3d.org/news/2012/download.html>, Internet Explorer Window Restrictions,(Oct. 22, 2008), 6 pages.

"Kiosk Browser Chrome Customization Firefox 2.x", Retrieved from: <http://stlouis-shopper.com/cgi-bin/mozdev-wiki/,pl?ChromeCustomization> *Making a new chrome for the kiosk browser*, Kiosk Project Kiosk Browser Chrome Customization Firefox-2.x,(Aug. 16, 2007), 2 pages.

Harrison, Richard "Symbian OS C++ for Mobile Phones: vol. 3 (Symbian Press): 3 (Paperback)", Retrieved from: <http://www.amazon.co.uk/Symbian-OS-Mobile-Phones-Press/dp/productdescription/0470066415>, (Jun. 16, 2003), 4 pages.

"How do you dial 1-800-FLOWERS", Retrieved from: <http://blogs.msdn.com/windowsmobile/archive/2007/02/06/how-do-you-dial-1-800-flowers.aspx>, (Feb. 6, 2007), 24 pages.

"Blackberry office tools: Qwerty Convert", Retrieved from: <http://blackberrysoftwarelist.net/blackberry/download-software/blackberry-office/qwerty_convert.aspx>, (Nov. 20, 2008), 1 page.

Gade, Lisa "Samsung Alias u740", Retrieved from: <http://www.mobiletechreview.com/phones/Samsung-U740.htm>, (Mar. 14, 2007), 6 pages.

"Dial a number", Retrieved from: <http://www.phonespell.org/ialhelp.html> on Nov. 20, 2008, 1 page.

"Apple IPhone—8GB AT&T", Retrieved from: <http://nytimes.com.com/smartphones/apple-iphone-8gb-at/4515-6452_7-32309245.html>, (Jun. 29, 2007), 11 pages.

"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/>, (May 13, 2008), 11 pages.

"PocketShield-New Screenlock App for the HTC Diamond and Pro", Retrieved from: <http://wmpoweruser.com/?tag=htc-touch-diamond>, (Nov. 6, 2008), 13 pages.

"SecureMe-Anti-Theft Security Application for S60 3rd", Retrieved from: <http://www.killermobile.com/newsite/mobile-software/s60- applications/secureme-%11-anti%11theft-security-application-for-s60-3rd.htm>, (Nov. 11, 2008),2 pages.
"Winterface Review", Retrieved from: <http://www.mytodayscreen.com/winterface-review/>, (Jul. 9, 2008),42 pages.
Oliver, Sam "Potential iPhone Usability and Interface Improvements", Retrieved from:<http://www.appleinsider.com/articles/08/09/18/potential_iphone_usability_and_interface_improvements.html>, (Sep. 18, 2008),4 pages.
"Google Android has Landed; T-Mobile, HTC Unveil G1", Retrieved from: <http://www.crn.com/retail/210603348> on Nov. 26, 2008., (Sep. 23, 2008),5 Pages.
"Alltel Adds Dedicated Search Key to Phones", Retrieved from: <http://www.phonescoop.com/news/item.php?n=2159> on Nov. 26, 2008., (Apr. 12, 2007),2 Pages.
Oryl, Michael "Review: Asus P527 Smartphone for North America", Retrieved from: <http://www.mobileburn.com/review.jsp?Id=4257> on Dec. 17, 2008., (Mar. 5, 2008),1 Page.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.
Ha, Rick et al., "Simkeys: An Efficient Keypad Configuration for Mobile Communications", Retrieved from: <http://ieeexplore.ieee.org/stamp/stamp.jsp?arnumber=01362557.>, (Nov. 2004),7 Pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.
"Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.
"Keyboard (5)", Retrieved from: <http://landru.uwaterloo.ca/cgi-bin/man.cgi?section=5&topic=keyboard> on Dec. 11, 2008., (Aug. 11, 1997),8 Pages.
"Calc4M", Retrieved from: <http://www.hellebo.com/Calc4M.html>, (Sep. 10, 2008),4 Pages.
"MIDTB Tip Sheet: Book Courier", Retrieved from: <http://www.midtb.org/tipsbookcourier.htm> on Dec. 11, 2008., (Sep. 26, 2005),6 Pages.
"Freeware .mobi", Retrieved from: <http://www.palmfreeware.mobi/download-palette.html>, (Oct. 9, 2001),2 pages.
"Palette Extender 1.0.2", Retrieved from: <http://palette-extender.en.softonic.com/symbian>, (Jan. 21, 2003),2 pages.
Rice, Stephen V., et al., "A System for Searching Sound Palettes", Retrieved from: <http://www.comparisonics.com/FindSoundsPalettePaper.pdf>, (Feb. 28-29, 2008),6 pages.
"Multi-touch", Retrieved from <http://en.wikipedia.org/wiki/Multi-touch#Microsoft_Surface>, (Apr. 17, 2009),8 pages.
Wilson, Tracy V., "How the iPhone Works", Retrieved from: <http://electronics.howstuffworks.com/iphone2.htm>, (Jan. 2007),9 pages.
"DuoSense™ Multi-Touch Gestures", Retrieved from: <http://www.n-trig.com/Data/Uploads/Misc/DuoSenseMTG_final.pdf>, (Jul. 2008),4 pages.
Vallerio, Keith S., et al., "Energy-Efficient Graphical User Interface Design", Retrieved from: <http://wvwv.cc.gatech.edu/classes/AY2007/cs7470_fall/zhong-energy-efficient-user-interface.pdf>, (Jun. 10, 2004),13 Pages.
Nordgren, Peder "Development of a Touch Screen Interface for Scania Interactor", Retrieved from: <http://www.cs.umu.se/education/examina/Rapporter/PederNordgren.pdf>, (Apr. 10, 2007),67 Pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),pp. 1-2.
"Symbian Applications", Retrieved from: <http://symbianfullversion.blogspot.com/2008_12_01_archive.html> on May 5, 2009., (Jan. 2009),51 Pages.
Remond, Mickael "Mobile Marketing Magazine", Retrieved from: <http://www.mobilemarketingmagazine.co.uk/mobile_social_networking/> on May 5, 2009., (Apr. 28, 2009),16 Pages.
"Womma", Retrieved from: <http://www.womma.org/blog/links/wom-trends/> on May 5, 2009., (2007),70 Pages.
Dolcourt, Jessica "Webware", Retrieved from: <http://news.cnet.com/webware/?categoryId=2010> on May 5, 2009., (Apr. 2009),13 Pages.
"HTC Shows HTC Snap with Snappy Email Feature", Retrieved from: <http://www.wirelessandmobilenews.com/smartphones/_on_5/5/09>, (May 4, 2009),10 Pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008),3 pages.
"Live Photo Gallery—Getting Started—from Camera to Panorama", Retrieved from: <http://webdotwiz.spaces.live.com/blog/cns!2782760752B93233!1729.entry> on May 5, 2009., (Sep. 2008),7 Pages.
Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.
Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (2006),4 Pages.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),pp. 1-14.
"Mobile/UI/Designs/TouchScreen", Retrieved from: <https://wiki.mozilla.org/Mobile/UI/Designs/TouchScreen> on May 6, 2009., (Feb. 2009),15 Pages.
"Introduction to Windows Touch", Retrieved from: <http://download.microsoft.com/download/a/d/f/adf1347d-08dc-41a4-9084-623b1194d4b2/Win7_touch.docx>, (Dec. 18, 2008),7 Pages.
Terpstra, Brett "Beta Beat: Grape, a New Way to Manage Your Desktop Clutter", Retrieved from: Beta Beat: Grape, a New Way to Manage Your Desktop Clutter on May 6, 2009., (Apr. 14, 2009),16 Pages.
"Touch Shell Free", Retrieved from: <http://www.pocketpcfreeware.mobi/download-touch-shell-free.html> on May 5, 2009., (Feb. 23, 2009),2 Pages.
"Parallax Scrolling", Retrieved from: <http://en.wikipedia.org/wiki/Parallax_scrolling> on May 5, 2009., (May 4, 2009),3 Pages.
Steinicke, Frank et al., "Multi—Touching 3D Data: Towards Direct Interaction in Stereoscopic Display Environments coupled with Mobile Devices", Retrieved from: <http://viscg.uni-muenster.de/publications/2008/SHSK08/ppd-workshop.-pdf.>, (Jun. 15, 2008),4 Pages.
Mann, Richard et al., "Spectrum Analysis of Motion Parallax in a 3D Cluttered Scene and Application to Egomotion", Retrieved from: <http://www.cs.uwaterloo.ca/~mannr/snow/josa-mann-langer.pdf.>, (Sep. 2005),15 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
Raghaven, Gopal et al., "Model Based Estimation and Verification of Mobile Device Performance", Retrieved from http://alumni.cs.ucsb.edu/~raimisl/emsoft04_12.pdf., (Sep. 27-29, 2004),10 Pages.
Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008., (Apr. 2, 2008),1 page.
Singh, Kundan et al., "CINEMA: Columbia InterNet Extensible Multimedia Architecture", Retrieved from http://www1.cs.columbia.edu/~library/TR-repository/reports/reports-2002/cucs-011-02.pdf, Sep. 3, 2002 ,83 Pages.
Kcholi, Avi "Windows CE .Net Interprocess Communication", Retrieved from http://msdn.microsoft.com/en-us/library/ms836784.aspx on Jul. 17, 2008., (Jan. 2004), 15 Pages.
Gao, Rui "A General Logging Service for Symbian based Mobile Phones", Retrieved from: <http://www.nada.kth.se/utbildning/ grukth/exjobb/rapportlistor/2007/rapporter07/gao_rui_07132. pdf.> on Jul. 17, 2008, (Feb. 2007),pp. 1-42.

"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009., 8 pages.

"Content-Centric E-Mail Message Analysis in Litigation Document Reviews", Retrieved from: http://www.busmanagement.com/article/Issue-14/Data-Management/Content-Centric-E-Mail-Message-Analysis-in-Litigation-Document-Reviews/., (May 6, 2009),4 Pages.

Mao, Jeng "Comments of Verizon Wireless Messaging Services, LLC", Retrieved from: http://www.ntia.doc.gov/osmhome/warnings/comments/verizon.htm on May 6, 2009., 5 Pages.

"Oracle8i Concepts Release 8.1.5", Retrieved from: http://www.cs.umbc.edu/help/oracle8/server.815/a67781/c16queue.htm on May 6, 2009., 10 Pages.

"Oracle8i Application Developer's Guide—Advanced Queuing", Retrieved from: http://www.cs.umbc.edu/help/oracle8/server.815/a68005/03_adq1i.htm on May 6, 2009., 29 Pages.

"PCT Search Report", Application Serial No. PCT/US2009/061864, (May 14, 2010), 10 pages.

"Final Office Action", U.S. Appl. No. 12/244,545, (Dec. 7, 2011), 16 pages.

"Final Office Action", U.S. Appl. No. 12/413,977, (Nov. 17, 2011), 16 pages.

"Final Office Action", U.S. Appl. No. 12/414,476, (Dec. 1, 2011),20 pages.

"Final Office Action", U.S. Appl. No. 12/469,458, (Nov. 17, 2011), 15 pages.

"Non-Final Office Action", U.S. Appl. No. 12/414,434, (Jan. 17, 2012), 7 pages.

"Non-Final Office Action", U.S. Appl. No. 12/469,419, (Nov. 9, 2011), 15 pages.

"Non-Final Office Action", U.S. Appl. No. 12/470,558, (Nov. 22, 2011),9 pages.

"Non-Final Office Action", U.S. Appl. No. 12/484,845, (Dec. 7, 2011), 16 pages.

"Non-Final Office Action", U.S. Appl. No. 12/560,081, (Dec. 7, 2011), 16 pages.

"Notice of Allowance", U.S. Appl. No. 12/414,455, (Jan. 4, 2012),4 pages.

"Notice of Allowance", U.S. Appl. No. 12/414,458, (Oct. 31, 2011),2 pages.

"Notice of Allowance", U.S. Appl. No. 12/414,458, (Nov. 29, 2011),2 pages.

La, Nick "Parallax Gallery", Available at <http://webdesignerwall.comtutorials/parallax-gallery/comment-page-1>,(Apr. 25, 2008), 16 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008), 16 pages.

"Final Office Action", U.S. Appl. No. 12/433,605, (Feb. 3, 2012), 11 pages.

"Final Office Action", U.S. Appl. No. 12/469,480, (Feb. 9, 2012), 17 pages.

"Final Office Action", U.S. Appl. No. 12/560,081, (Mar. 14, 2012), 16 pages.

"Non-Final Office Action", U.S. Appl. No. 12/244,545, (Mar. 27, 2012), 18 pages.

"Non-Final Office Action", U.S. Appl. No. 12/433,667, (Feb. 3, 2012), 16 pages.

Beiber, Gerald et al., "Screen Coverage: A Pen-Interaction Problem for PDA's and Touch Screen Computers", in Proceedings of ICWMC 2007, (Mar. 2007), 6 pages.

Wyatt, Paul "/Flash/the art of parallax scrolling", .net Magazine, (Aug. 1, 2007), pp. 74-76.

"Final Office Action", U.S. Appl. No. 12/433,667, (Sep. 13, 2011), 17 pages.

"Non-Final Office Action", U.S. Appl. No. 12/244,545, (Aug. 17, 2011), 15 pages.

"Non-Final Office Action", U.S. Appl. No. 12/413,977, (Jul. 19, 2011), 17 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/433,667, (Jun. 7, 2011), 15 pages.

"Non-Final Office Action", U.S. Appl. No. 12/469,458, (Jul. 1, 2011), 15 pages.

"Non-Final Office Action", U.S. Appl. No. 12/469,480, (Sep. 22, 2011), 14 pages.

"Non-Final Office Action", U.S. Appl. No. 12/484,799, (Aug. 11, 2011), 12 pages.

"Notice of Allowance", U.S. Appl. No. 12/414,458, (Aug. 10, 2011), 6 pages.

"Advisory Action", U.S. Appl. No. 12/433,605, (Apr. 5, 2012), 3 pages.

"Extended European Search Report", European Patent Application Number 09818253.8, (Apr. 10, 2012), 7 pages.

"Final Office Action", U.S. Appl. No. 12/484,799, (Apr. 30, 2012), 13 pages.

"Non-Final Office Action", U.S. Appl. No. 12/414,434, (May 31, 2012), 7 pages.

"Non-Final Office Action", U.S. Appl. No. 12/469,419, (May 23, 2012), 13 pages.

"Notice of Allowance", U.S. Appl. No. 12/470,558, (Apr. 2, 2012), 7 pages.

"Notice of Allowance", U.S. Appl. No. 12/484,845, (Mar. 16, 2012), 5 pages.

* cited by examiner

1100 ⟶

1102
Display an unlock screen by a mobile communications device that indicates that one or more keys of the mobile communications device are locked

1104
If an input at the mobile communications device is detected to remove the lock, display an animation that gives an appearance that the unlock screen is a page that is being turned and remove the lock of the one or more keys

1202
Display a clock on a display device in response to a waking of the display device

↓

1204
Minimize the display of the clock after a specified amount of time has passed since the waking of the display device

1302
Update an unlock screen of a mobile communications device to include notifications of events that have occurred since a last time the mobile communications device was locked

1304
If a number of the notifications that are to be output on the unlock screen exceeds a specified number, condense the notifications into a single condensed notification to be output via the unlock screen that references a type and number of the notifications

1306
Rearrange the notifications as subsequent notifications are received if the number of the notifications that are to be output on the unlock screen does not exceed the specified number

*Fig. 13*

NOTIFICATIONS

BACKGROUND

Mobile communications devices (e.g., wireless phones) have become an integral part of everyday life. For example, a user traditionally used mobile communications devices to place and receive telephone calls when the user was away from a fixed communication device, e.g., a house or office telephone. In some instances, the mobile communications device became the primary device via which the user communicated with other users as the user became accustomed to the convenience and functionality of the device.

Further, the communication techniques that may be employed using a mobile communications device have increased. For example, users were traditionally limited to telephone calls between mobile communications devices. Advances were then made to provide a variety of other communication techniques, e.g., text messaging and email. However, inclusion of these additional communication techniques on mobile communications devices having traditional form factors may cause these devices to become unwieldy and less suitable for mobile applications. For example, traditional input devices that were employed by these communication techniques may be less suitable when applied by traditional mobile communications devices.

SUMMARY

Unlock screen and notification techniques are described. In an implementation, an unlock screen is displayed by a mobile communications device that indicates that one or more keys of the mobile communications device are locked. If an input is detected at the mobile communications device to remove the lock, an animation is displayed that gives an appearance that the unlock screen is a page that is being turned and removing the lock of the one or more keys.

In an implementation, an unlock screen is updated of a mobile communications device to include notifications of events that have occurred since a last time the mobile communications device was locked. If a number of the notifications that are to be output on the unlock screen exceeds a specified number, the notifications are condensed into a single condensed notification to be output via the unlock screen that references a type and number of the notifications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 11 depicts a procedure in an example implementation in which an animation is displayed in conjunction with removal of a key lock of a mobile communications device.

FIG. 12 depicts a procedure in an example implementation in which a clock is displayed.

FIG. 13 depicts a procedure in an example implementation in which a condense mechanism is employed with notifications.

DETAILED DESCRIPTION

Overview

The use of physical control descriptors (e.g., text, images of an action to be performed, and so on) on a mobile communication device that explain how to unlock a touch screen user interface (UI) may be limiting and tough to decipher. Likewise, conventional gestures that are virtualizations of mechanical switches may also be hard to learn and/or discover.

In one or more implementations, an unlock screen is described that acts like a piece of paper (e.g., vellum) that is curled up at the corner to unlock a mobile device. The corner may be animated to look like it is blowing in a soft breeze to call attention to the corner. To unlock the mobile device, a gesture may be performed that mimics a physical behavior of turning a page to unlock the mobile communications device. Therefore, in this example a user may readily ascertain how to unlock the mobile communications device without a text description or other physical control descriptor. While the phone is locked, the vellum may be used to partially disguise portions of a user interface (UI) behind it to increase visibility of a clock. For example, the vellum of the UI may be configured to be translucent to allow notifications (e.g., updates and alerts) to be at least partially visible from the underlying UI.

Additional techniques are also described may also provide a variety of functionality, such as serve as an outlet for user customization, display the time, display incoming communication-related notifications since the last time the device was locked, permit the user to perform emergency functions, secure phone content after certain time (e.g., a PIN lock), permit a device "wipe" if a PIN is entered incorrectly a predetermined number of times, provide an entry point for basic music playback control, provide a repository for unnoticed notifications, display notifications that a user has already seen, and so on, further discussion of which may be found in relation to the following description.

In the following discussion, a variety of example implementations of a mobile communications device are shown. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile communications devices are also contemplated, such as dedicated messaging devices, music players, portable game devices, and so on.

Unlock Screen

Figure 1:
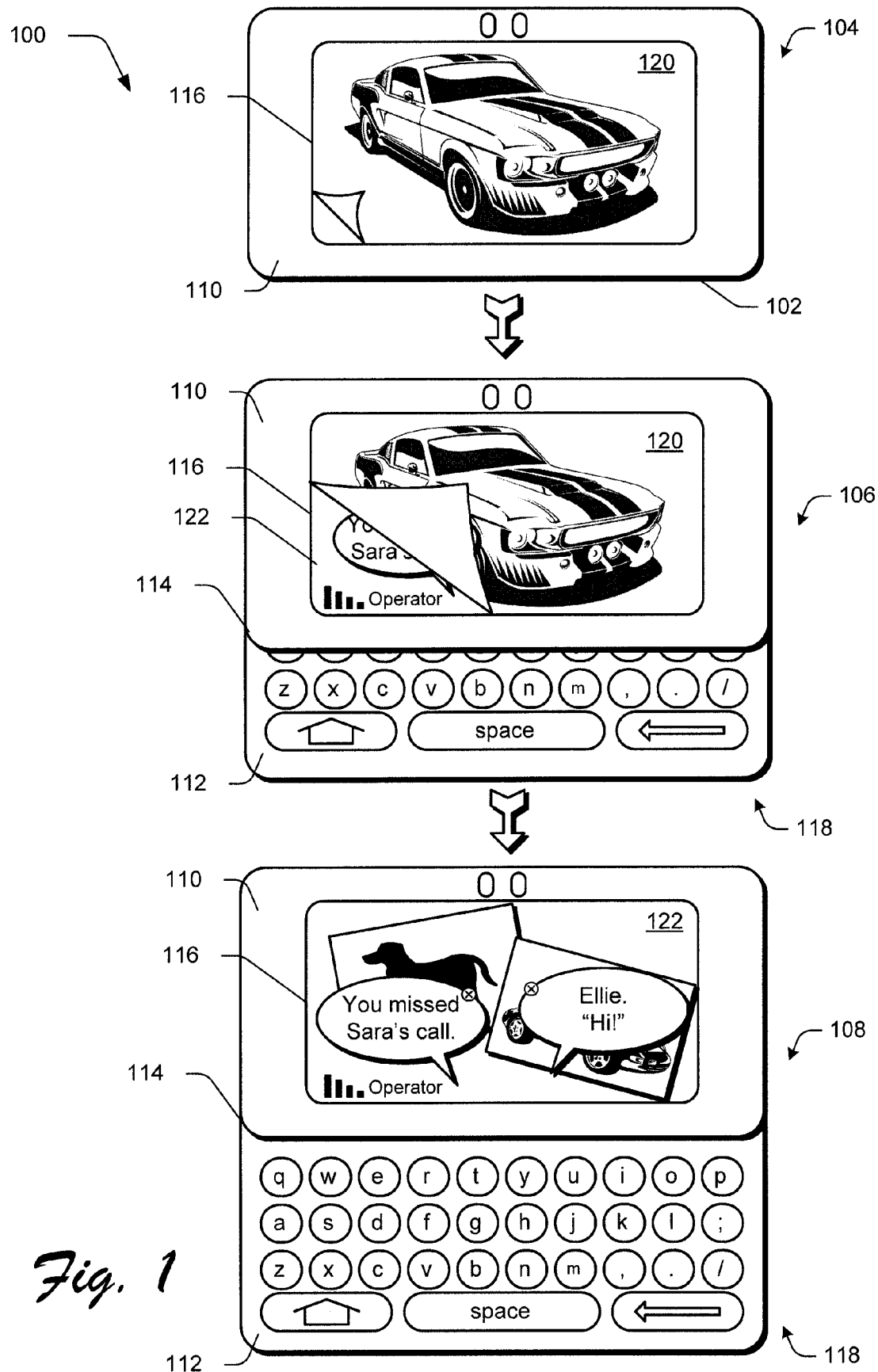
FIG. 1 is an illustration of an example implementation of a mobile communications device in accordance with one or more embodiments of devices, features, and systems for mobile communications.

FIG. 1 is an illustration of an example implementation 100 of a mobile communications device 102 in accordance with one or more embodiments of devices, features, and systems for mobile communications. The mobile communications device 102 is illustrated as assuming a plurality of configurations, examples of which include a first configuration 104, a second configuration 106, and a third configuration 108.

The mobile communications device 102 is further illustrated as including a first housing 110 and a second housing 112 that are connected via a slide 114 such that the first and second housings 110, 112 may move (e.g., slide) in relation to one another. The first housing 110 includes a display device 116 (e.g., a touchscreen) that may be used to output a variety of data, such as a caller identification (ID), information related to text messages as illustrated, email, multimedia messages, Internet browsing, game play, music, video and so on. The second housing 112 is illustrated as including a keyboard 118 that may be used to provide inputs to the mobile communications device 102. Although the keyboard 118 is illustrated as a QWERTY keyboard, a variety of other examples are also contemplated, such as a twelve key numeric pad.

In the example shown in FIG. 1, the first and second housings 110, 112 of the mobile communications device 102 are rectangular. For example, a plane defined by an outer surface of the display device 116 may be parallel to a plane of the first housing 110 that approximates a rectangle, which may be the same as or different from the plane defined by the display device 116. In another example, the width and height of the plane taken from the first housing that is parallel to the other surface of the display device 116 are approximately square (e.g., one-to-one so as to be equilateral rectilinear). A variety of other examples are also contemplated.

In the first configuration 104, the mobile communications device 102 is closed such that the first housing 110 covers the second housing 112. Consequently, the keyboard 118 disposed on the second housing 112 is covered and thus is not available to receive inputs from a user of the mobile communications device 102. In an implementation, telephonic functionality is still available when the mobile communications device 102 is in the first configuration 104, e.g., to receive and answer a telephone call via interaction with the display device 116 or other buttons disposed either of the first and/or second housings 108, 110.

In the second configuration 106, the first housing 108 is moved (e.g., slid) "away" from the second housing 112 using the slide 114. In this example configuration, a portion of the keys of the keyboard 118 is exposed such that the exposed keys are available to receive inputs from a user. In another implementation, however, use of the keys of the keyboard 116 is restricted until the mobile communications device 106 assumes the open configuration illustrated in the third configuration 108 to help prevent inadvertent inputs. In an implementation, the planes of the first and second housings 110, 112 that are used to define the square form factor are parallel to each other, although other implementations are also contemplated.

In the third configuration 108, the first housing 108 is moved further "away" from the second housing 112 using the slide 114. In this example configuration, at least a majority of the keys of the keyboard 118 are exposed and are available to receive inputs from a user. Accordingly, the third configuration 108 may be considered an "open" configuration. In the illustrated implementation 100, the display device 116 remains viewable by a user in each configuration, examples of which are shown in the first, second, and third configurations 110, 112, 114.

The display device 116 is further illustrated as including an unlock screen 120 that once unlocked may reveal an underlying user interface 122, unlock a key lock placed physical and/or displayed keys on the mobile communications device 102, and so on. In the illustrated implementation of FIG. 1, the first housing 110 is slid away from the second housing 112 to unlock keys of the mobile communication device 102. When the keys are locked, mobile communications device 102 application functionality is not accessible and the device does not respond to keyboard 118 presses.

In the illustrated implementation 100, the unlock screen 120 is animated in a manner mimicking a page being turned such that the user interface 122 is exposed as the first and second housings 110, 112 are slid away from each other. For example, as shown in the second configuration 106 the unlock screen 120 is partially turned to reveal the user interface 122 underneath. In the third configuration 108 of FIG. 3, the user interface 122 is completely exposed as the mobile communications device 102 has assumed the "open" configuration and is ready to receive inputs entered via the keyboard 118 and/or display device 116. In an implementation, the unlock screen 120 may mimic a layer of vellum that is partially translucent to reveal portions of the user interface 112 below, e.g., to display notifications and so on as further described in relation to FIG. 5. The unlock screen 120 may also be unlocked using a gesture, further discussion of which may be found in relation to the following figure.

Figure 2:
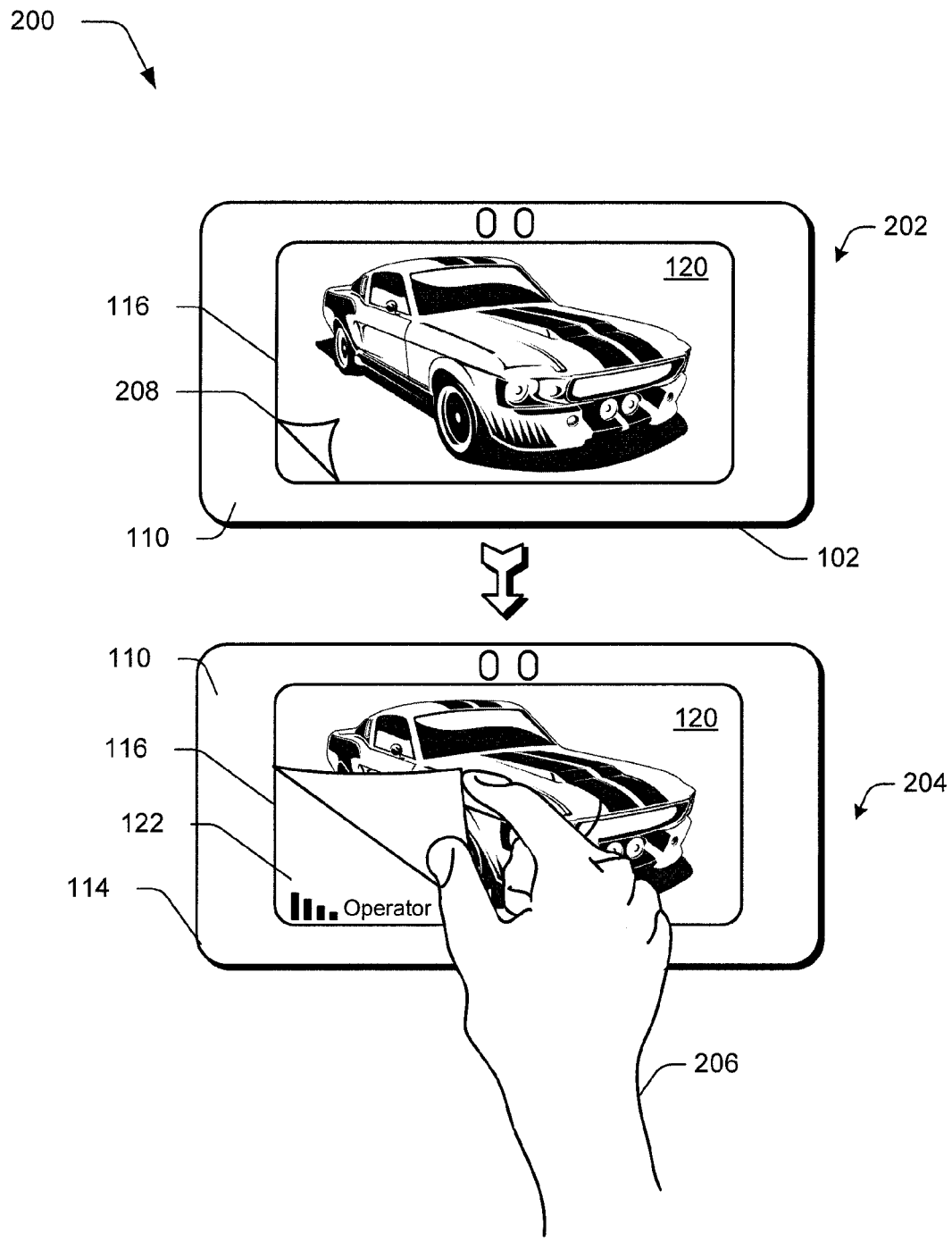
FIG. 2 illustrates an example implementation in which a gesture is used to unlock an unlock screen of FIG. 1.

FIG. 2 illustrates an example implementation 200 in which a gesture is used to unlock the unlock screen 120 of FIG. 1. In the illustrated implementation, a first configuration 202 is shown in which the mobile communications device 102 is in a key locked state such that the display device 116 is not configured to receive inputs, e.g., a key press entered via a touchscreen.

A gesture is then initiated in the second configuration 204 by a user's hand 206. For example, a finger of the user's hand 206 may be used to select a corner 208 of the unlock screen 120, which in this instance is illustrated as an upturned corner of a page. The user's hand 206 (and more particularly the user's finger) may then be used to drag the corner 208 across the display device 116 to mimic turning the page as illustrated in the second configuration 204.

Thus, a user may activate the animation and unlock sequence on the display device 116 by grabbing a touch target (e.g., the upturned corner of the page) and "dragging" it across the screen as shown in FIG. 2. The corner of the unlock screen 120 may visually follow the user's finger as it is dragged along the surface of the display device 116, exposing some portion of a UI 122 "underneath" the unlock screen 120, such as a PIN unlock pad if the user is removing a device lock (which is described in further detail below). Thus, the gesture may be used to remove a key lock (i.e., unlock) the mobile communication device 102 and enable interaction with the underlying user interface 122.

Figure 3:
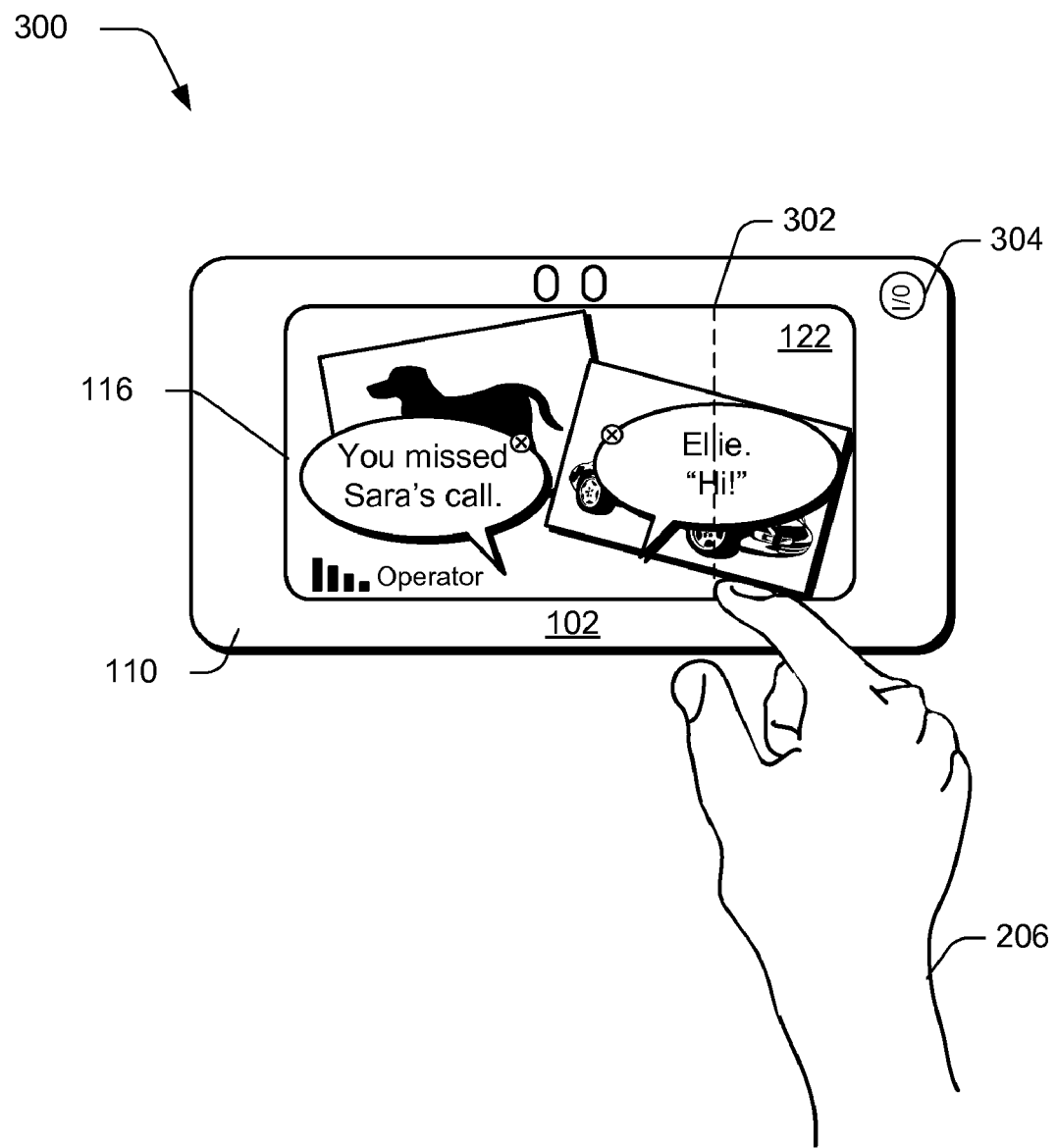
FIG. 3 illustrates an example implementation in which a mobile communication device of FIG. 2 is unlocked after completion of the gesture.

FIG. 3 illustrates an example implementation 300 in which the mobile communication device 102 of FIG. 2 is unlocked after completion of the gesture. Once the finger of the user's hand has crossed a threshold 302 (which in this instance is illustrated as seventy five percent of the way across the display device 116 from the touch target), the unlock screen 120 is removed. If the finger of the user's hand is removed before then, the unlock screen 120 may animate back as shown in the first configuration 202 of FIG. 2 and the key lock remains in place.

Once the threshold 302 is crossed at any point along the Y-axis by the finger of the user's hand 206 and the user releases the gesture (e.g., lifts the finger off the display device 116), the unlock screen 120 of FIG. 2 may complete animating away by continuing a turn of the page and the key lock is removed thereby exposing the user interface 122. If the user does not release the gesture (e.g., ceases the pan) and moves the finger of the user's hand 206 back toward the left side of the display device 116, the corner animation may follow the finger of the user's hand 206. Thus, a release of the touch target (e.g., the upturned corner of the unlock screen 120) on the left side of the threshold 302 may result in the device remaining locked, similar to not having crossed the threshold.

The mobile communications device 102 may also keep a timer to track idle time, which may reset each time a user leaves the mobile communications device 102 idle. For example, when mobile communications device 102 is active (not in a locked state), ten seconds of non-interaction may result in dimming of the display device 116. The mobile communications device 102 may then wait a specified amount of time before initiating the unlock screen 120 described previously.

If the mobile communications device 102 is already locked and the user illuminates the display device 116, the mobile communications device 102 may remain at full brightness for ten seconds before fading to half brightness. After ten or more seconds have elapsed without interaction, a full "key locked" state may be entered in which the display device 116 is turned off, which may be reversed by a user through pressing a hardware key. The timer may be reset if user selects the touch target (e.g., the corner 208 of the unlock screen 120 of FIG. 2) and does not begin again until the user is no longer interacting with the mobile communications device 102.

After entering the "key locked" state, the mobile communications device 102 may preserve a state of an application that is executing on the mobile communications device 102, such as an application that is displayed in the "foreground" of the user interface 122. When the user unlocks the mobile communications device 102, the user may be returned to the state of the application when the mobile communications device 102 was locked. In an implementation, downloads, message sending, music playing and other application processes initiated before the lock state may continue even if the display device 116 is locked. Further, an application may elect to change behavior if the display device 116 is locked, i.e., the unlock screen 120 is being employed. Examples include movie playback and games, which may pause if screen locks, further discussion of which may be found later in the description.

When a power key 304 is pressed, the mobile communications device 102 may enter a key locked state and turn the display device 116 off. If the mobile communications device 102 is already locked and the mobile communications device 102 receives an incoming phone call, interaction with one or more of the hardware or software keys of the mobile communications device 102 may be used to silence the ringer but does not turn the display device 116 off.

If the mobile communications device 102 is unlocked when a telephone call is received, a first tap on the power key 304 or interaction with another hardware or displayed key may silence the ringer. The mobile communications device 102 may remain unlocked and the timer restarted for screen timeout and device idle. A second press on the power key 304 may result in locking the mobile communications device 102 and turning the display device 116 off.

In an implementation, if the user has turned off or reset the mobile communications device 102, the mobile communications device 102 starts in the key locked state if there is a device lock and a PIN is enabled. If not, the mobile communications device 102 proceeds directly to a home screen of the user interface 122 after reboot.

The key lock and the unlock screen 120 may be utilized in a variety of other instances. For example, if a proximity sensor indicates that the mobile communications device 102 is being held vertically during a telephone call, the display device 116 may be turned off and key lock turned on (i.e., the key locked state is entered) thereby initiating the unlock screen 120. The key lock may turn off if the mobile communications device 102 is turned horizontally again.

Figure 4:
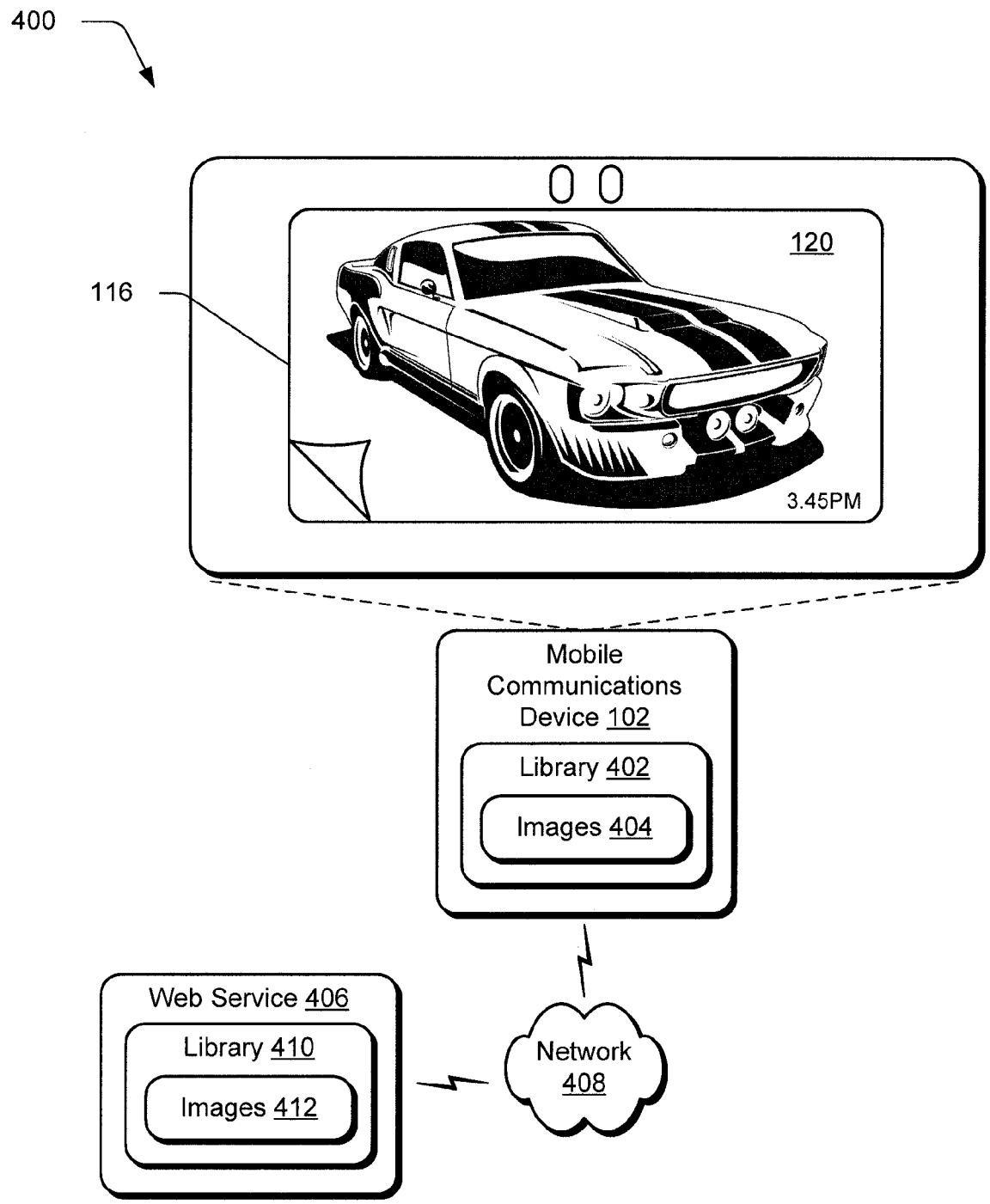
FIG. 4 illustrates an example implementation in which the mobile communications device of FIG. 1 is shown as having the unlock screen configured to include a specified image.

FIG. 4 illustrates an example implementation in which the mobile communications device 102 of FIG. 1 is shown as having the unlock screen 120 configured to include a specified image. In this implementation, the user may elect an image (which may be static or dynamic) to appear on the unlock screen 120. In an implementation, this image appears in the background of the display device 116 and is fully visible if the mobile communications device 102 does not have a notification to output, e.g., low battery level as further detailed below.

The image may come from a variety of different sources. For example, the user may select from a library of images that are local to the mobile communications device 102, which may be populated with default content, taken by an image capture device that is part of the mobile communications device 102, and so on. A user may also access a web service 406 over a network 408 (e.g., the Internet) to access a library of images 412, such as an online marketplace having wallpapers for sale, and download a particular image.

In an implementation, a particular image may be specified via a setting that is accessible from a settings screen. For example, the user interface 120 may output a selection screen to select an image from a locally stored gallery of wallpaper or to enter the photo gallery collection. After the user navigates to a gallery and selects an image for use for the wallpaper, the user may be presented with a confirmation screen to preview the image and confirm or cancel the use of the image. The image capture device 120 may resize the image to conform to the display device 116, e.g., crop the image.

Output of images 404 by the mobile communications device 102 on the unlock screen 120 may also be dynamic.

For example, a dynamic image may be selected via a "Use Favorites" section of a settings screen. If the user elects to "Use Favorites" and has images in the Favorites folder, the unlock screen 120 may display the images 404 in succession on the unlock screen 120. In an implementation, when this feature is first selected, a first picture in a favorites folder is started on unlock. Each subsequent rotation takes a next image in the folder. Images may appear when button is pressed and a rotation animation may be employed in response to an input received via a key (e.g., a back key) to click through photos while in the key locked state.

If the user does not have images selected as favorites, selection of this option may cause the mobile communications device to output instructions to select images to go into the favorites folder before using this option. The mobile communications device 102 may then continue to use the previously selected image (e.g., a default wallpaper). If desired, the user may be given an option to navigate to a photo gallery on the mobile communications device 102 to populate the favorites folder before returning to the settings screen.

Figure 5:
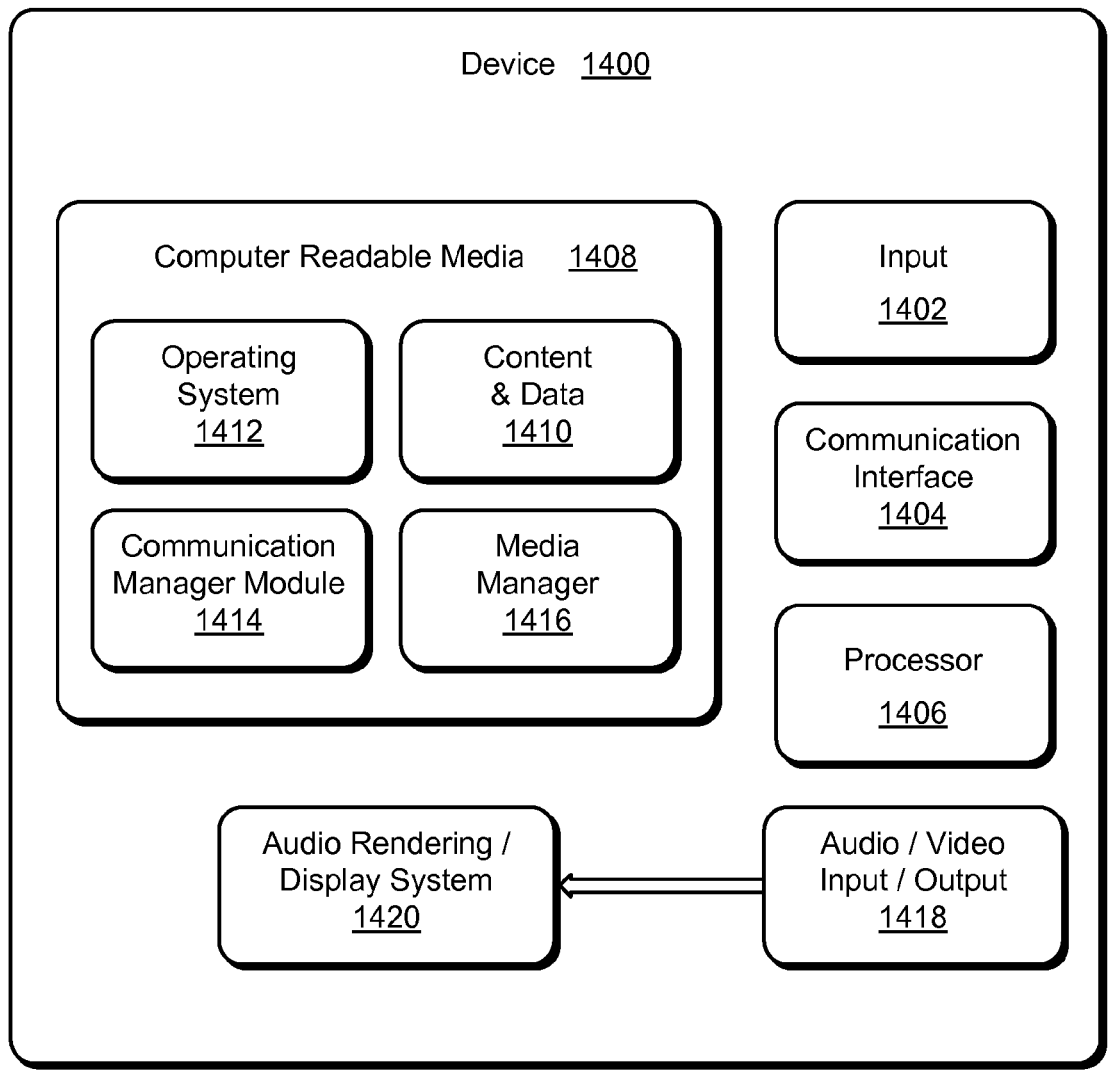
FIG. 5 illustrates an example implementation of the mobile communications device of FIG. 1 as outputting an unlock screen having a clock that illustrates the date and time in this instance.

FIG. 5 illustrates an example implementation 500 of the mobile communications device 102 of FIG. 1 as outputting an unlock screen 120 having a clock 502 that illustrates the date and time in this instance. In the illustrated example, the unlock screen 120 may be output by the mobile communications device 102 as monochrome on the display device 116 to maximize visibility without using a backlight, thereby conserving battery resources.

The unlock screen 120 includes a clock 502 having a time and date, which is displayed in the center of the display device 116 in this example. Time may be updated continuously, regardless of whether display device 116 is turned on or off. This way, the clock remains up-to-date as soon as the display device 116 is turned on.

When the display device 116 is initiated (i.e., "turned on" or illuminated), the clock to consume a substantial portion of the display device. For example, as illustrated the clock 502 is illustrated as being displayed in the center of the display device. After a specified amount of time, the amount of the display area of the display device 116 consumed by the clock 502 may be reduced, such as by minimizing the clock 502 for display at a corner of the display device 116 as illustrated in the unlock screen 120 of FIG. 4. In an implementation, the minimized clock may be selected to expand the view in the unlock screen 120.

The unlock screen 120 also includes silhouettes 504, 506, 508 of notifications in the same places as the notifications are to appear in the user interface 122. In an implementation, the unlock screen 120 is updated as notifications are to be output, e.g., a low battery condition, further discussion of notifications may be found in relation to the notifications section of the description.

Notifications

The unlock screen 120 may be leverage to output a variety of different types of notifications. Further, these types of notifications may be assigned a priority that may be used to determine how (and even whether) the notifications are to be output in conjunction with the unlock screen. For example, "high priority" notifications may be output using a "full screen", i.e., the notification consumes a majority of an available display area of the display device 116. Notifications that have a lesser priority may be managed and output in a manner that reflects this lesser priority. Thus, the mobile communications device 102 may provide techniques to manage notifications in a dynamic way that address the priority of the notification as well as a relatively limited display area of the display device 116 of the mobile communications device 102.

Figure 6:
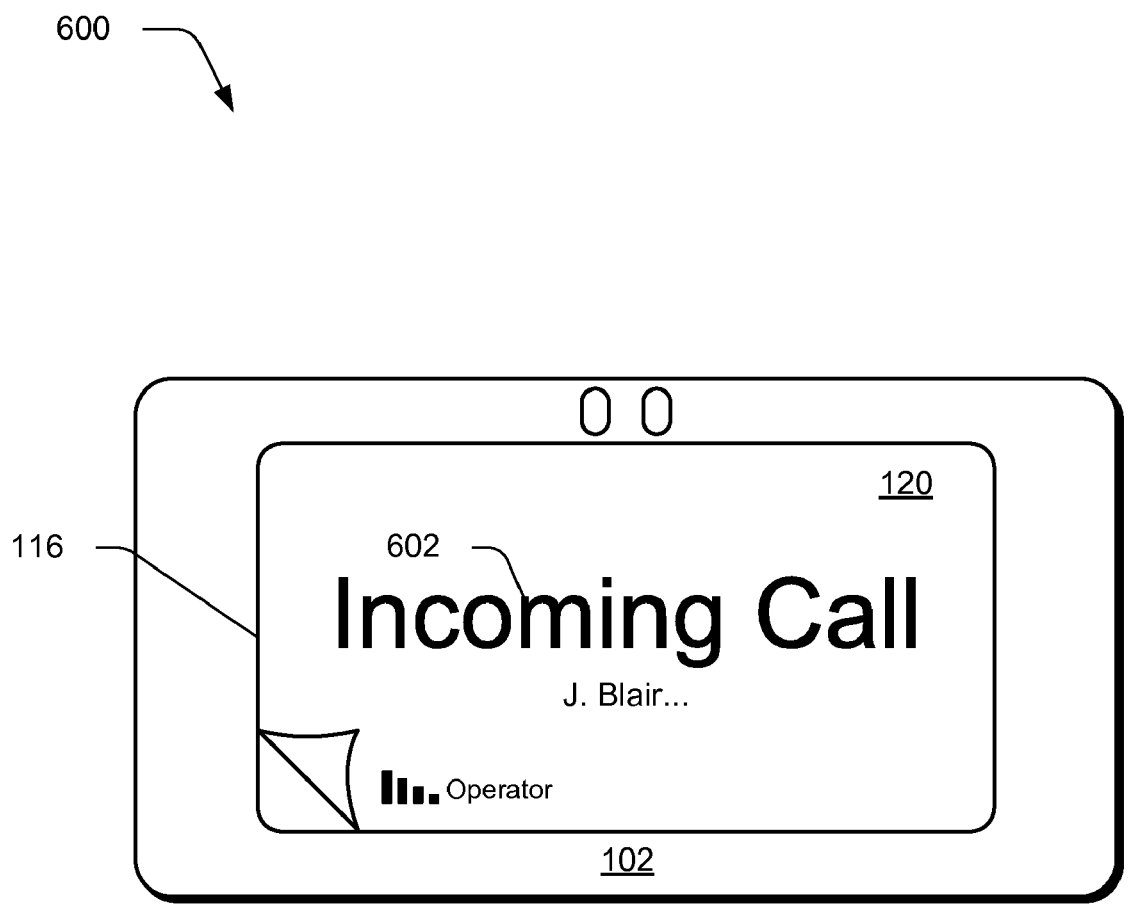
FIG. 6 illustrates an example implementation of the mobile communications device of FIG. 1 as outputting a full-screen notification.

FIG. 6 illustrates an example implementation 600 of the mobile communications device 102 of FIG. 1 as outputting a full-screen notification. In this example, the unlock screen 120 is configured such that the user may address a particular type of notification without unlocking the mobile communications device 102. For instance, this type of notifications may include an incoming phone call notification 602 as illustrated in FIG. 6, an alarm clock notification, and so on. In an implementation, these high priority notifications persist until the mobile communications device 102 is unlocked as previously described.

When this particular type of "high priority" notification has been addressed, the mobile communications device 102 may return to the key locked state with the screen timer reset to power down the display device 116. Thus, this particular type of "high priority" notifications may be output and interacted with out manually unlocking the mobile communications device 102. The unlock screen 120 may also be configured to output notifications having a lesser priority, further discussion of which may be found in relation to the following figure.

Figure 7:
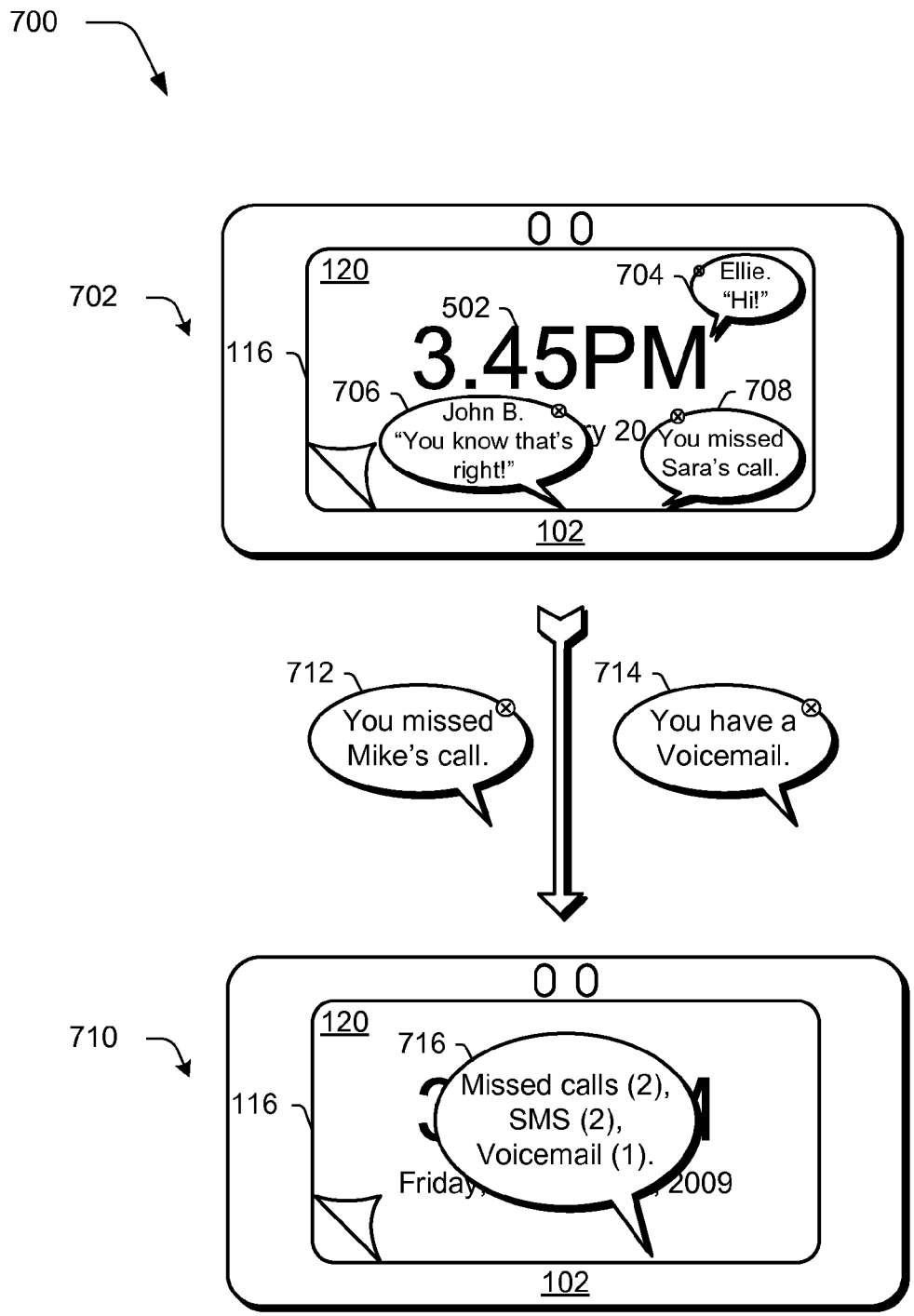
FIG. 7 illustrates an example implementation of the mobile communications device of FIG. 1 as arranging and outputting notifications for display in conjunction with the unlock screen 120.

FIG. 7 illustrates an example implementation 700 of the mobile communications device 102 of FIG. 1 as arranging and outputting notifications for display in conjunction with the unlock screen 120. In an implementation, the unlock screen 120 is not configured to be an aggregate view of each of a user's unnoticed notifications. Rather, the unlock screen 120 may be configured to provide a summary view of each notification that is to be output since the last time the mobile communications device 102 was unlocked.

In a first configuration 702 of the example implementation 700 of FIG. 7, notifications 704, 706, 708 of texts and a missed call are displayed in respective "talk balloons." These notifications 704-708 are illustrated as obstructing an underlying image 502, which is a clock in this instance, until the mobile communications device 102 has been unlocked.

The mobile communications device 102 may employ one or more techniques to arrange the notifications 704-708 such that the clock 502 is not occluded. In some instances, however, a number of notifications may be so great as to obscure each other as well as the clock 502. Accordingly, a condense mechanism may be employed as shown in the second configuration 710 of FIG. 7. In this example, a user of the mobile communications device 102 may miss a call that would cause a notification 712 of the missed call as well as a notification 714 of a voicemail to be output. However, output of these notifications 712, 714 with the notifications 704-708 may cause the unlock screen 120 to become cluttered to a point at which the notifications are difficult to view.

Accordingly, the condense mechanism may be employed to condense the notifications 704-714 into a single notification 716 that references each of the other notifications 704-714. For example, the notification 716 in the second configuration 710 as illustrated references two missed calls, two text messages and a voicemail. Thus, the notification 716 enumerates a number and type of message that the user has not yet seen and readily informs the user as to "what was missed" since the unlock screen 120 was last unlocked. In an implementation, a setting may be provided by the mobile communications device 102 to disable display of particular types of notifications, e.g., permit or deny notifications according to priority.

Although these techniques has been described in relation to the unlock screen 120, it should be apparent that these techniques may be applied to a wide variety of user interfaces, such as a home screen of the user interface 122 previously described to manage notifications.

Figure 8:
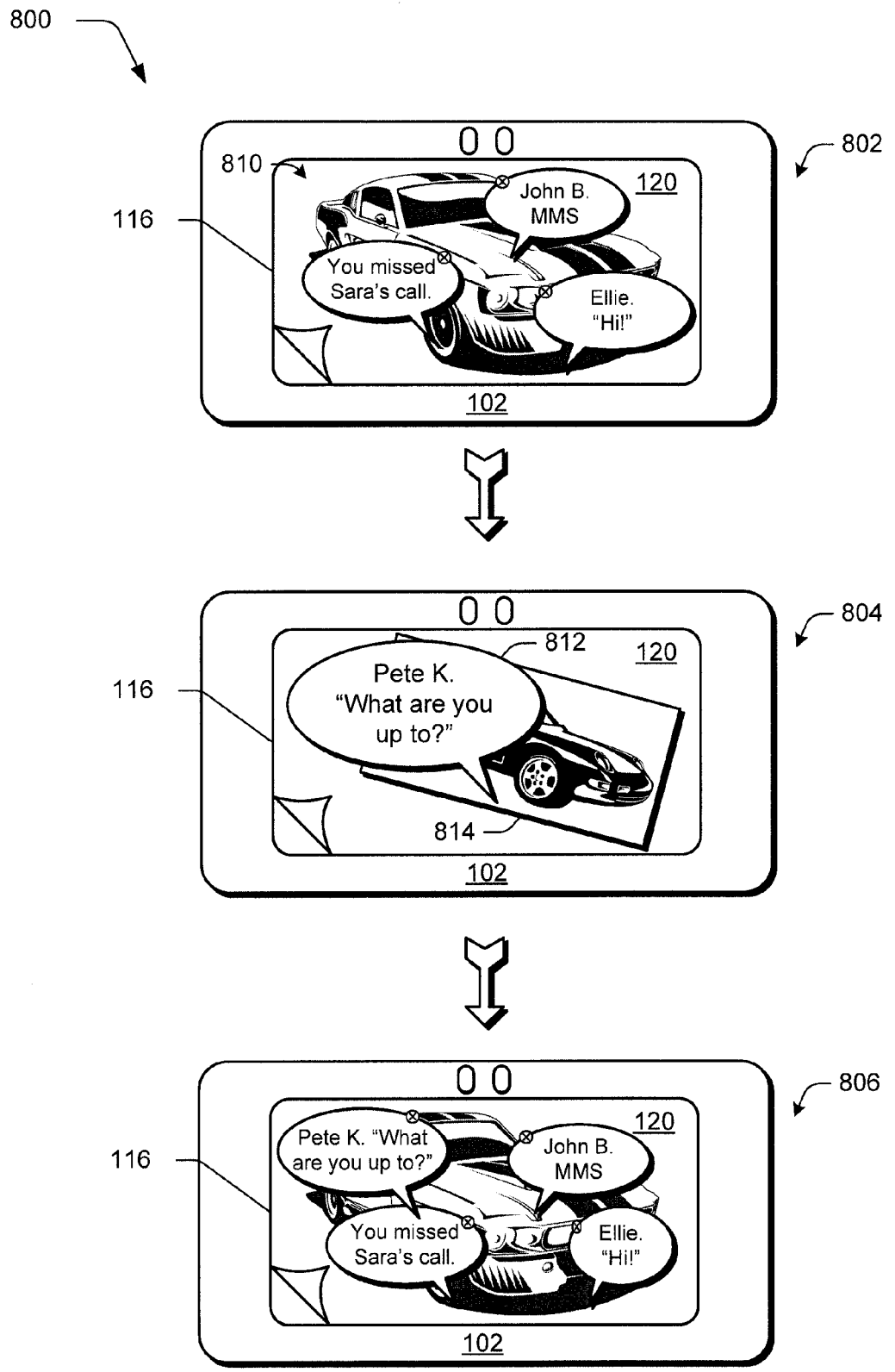
FIG. 8 illustrates an example implementation in which a notification is displayed singly as received and then displayed in conjunction with other notifications.

FIG. 8 illustrates an example implementation 800 in which a notification is displayed singly as received and then displayed in conjunction with other notifications. This example implementation 800 illustrates first, second, and third configurations 802, 804, 806 of the mobile communications device 102. In the first configuration 802, the lock screen as output on the display device 116 includes three notifications 810.

A SMS text is then received, which causes the mobile communications device 102 to assume the second configuration 804 in which a new notification 812 is output that corresponds to the new SMS text. Associated contact information 814 is also output that corresponds to a sender of the SMS text. In this example, the notification 812 and the information 814 as output in the second configuration 804 replace the output of the notifications 810 and image in the first configuration 802, thereby calling attention to the notification 812.

After a specified amount of time has passed, the mobile communications device 102 (and more particularly the unlock screen 120) assumes the third configuration 806. In the third configuration 806, the notification 812 of the second configuration 804 is added to the notifications 810 of the first configuration 802. In an implementation, the techniques of this implementation 800 may be leveraged with the condense mechanism of FIG. 7 such that the third configuration 806 is not cluttered when the amount of notifications exceeds a specified amount.

Figure 9:
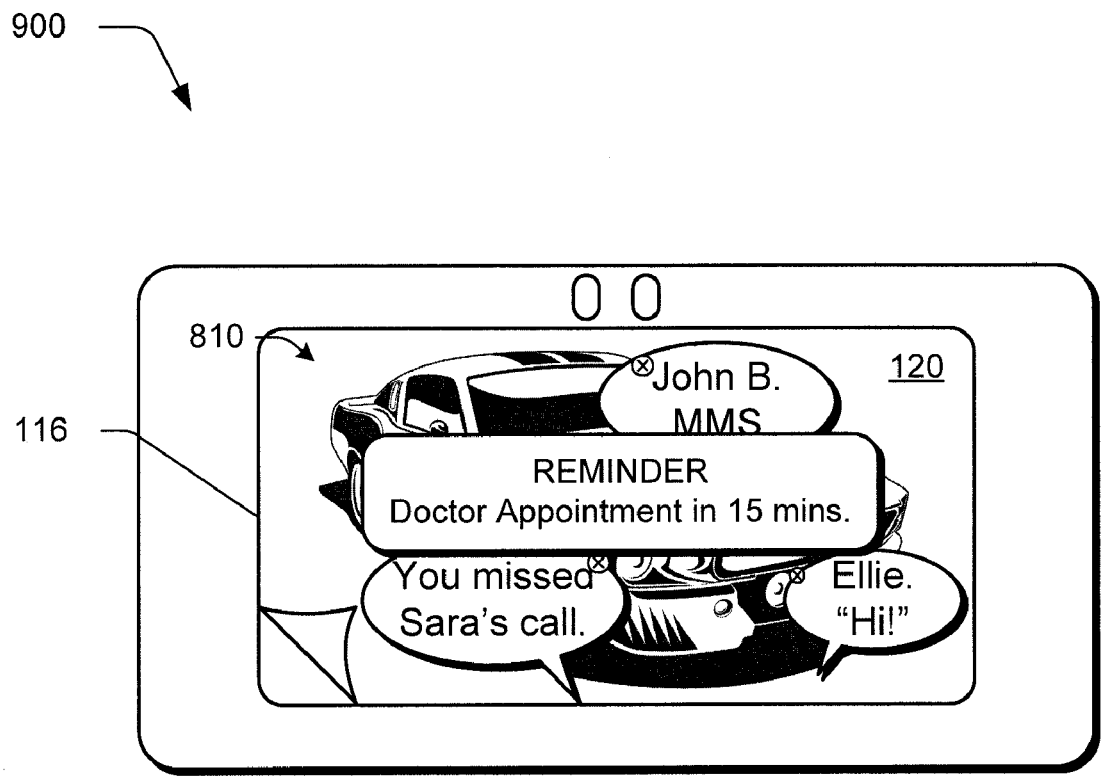
FIG. 9 illustrates the mobile communications device in an example implementation in which a notification that is assigned a medium priority is output with notifications that are assigned a low priority.

FIG. 9 illustrates the mobile communications device 102 in an example implementation 900 in which a notification that is assigned a medium priority is output with notifications 810 that are assigned a low priority. As previously described, notifications may be assigned different priorities in a variety of ways, such as based as a likelihood of being of interest to a user at a particular point in time. Therefore, notifications may have a priority that changes over time.

The mobile communications device 102 may leverage these priorities in order to arrange the notifications on the unlock screen 120. As illustrated in FIG. 9, for instance, notifications 810 from FIG. 8 are displayed that include missed telephone calls and texts. Another notification 902 is also displayed that has been assigned a medium priority, which is illustrated as a reminder of a doctor's appointment in 15 minutes. Because the reminder has been assigned a medium priority, it is displayed in a layer "above" the layer of the low priority notifications. Although a calendar reminder has been described, it should be apparent that a wide variety of notifications may be assigned a medium priority, such as battery low indicators, an alarm clock, and so on.

In an implementation, notifications having a medium priority when displayed on the unlock screen 120 may not be interacted with out unlocking the mobile communications device 102. If the user chooses to unlock the mobile communications device 102 rather than dismiss the notification 902, the notification 902 (when assigned a medium priority) may persist on top of the notifications 810 having a low priority after the mobile communications device 102 has been unlocked.

Although the notification techniques have been described in relation to an unlock screen 120, it should be readily apparent that these techniques may be implemented in a wide variety of user interfaces, such as in a home screen of the user interface 122 described previously.

Emergency Contact User Interface

Figure 10:
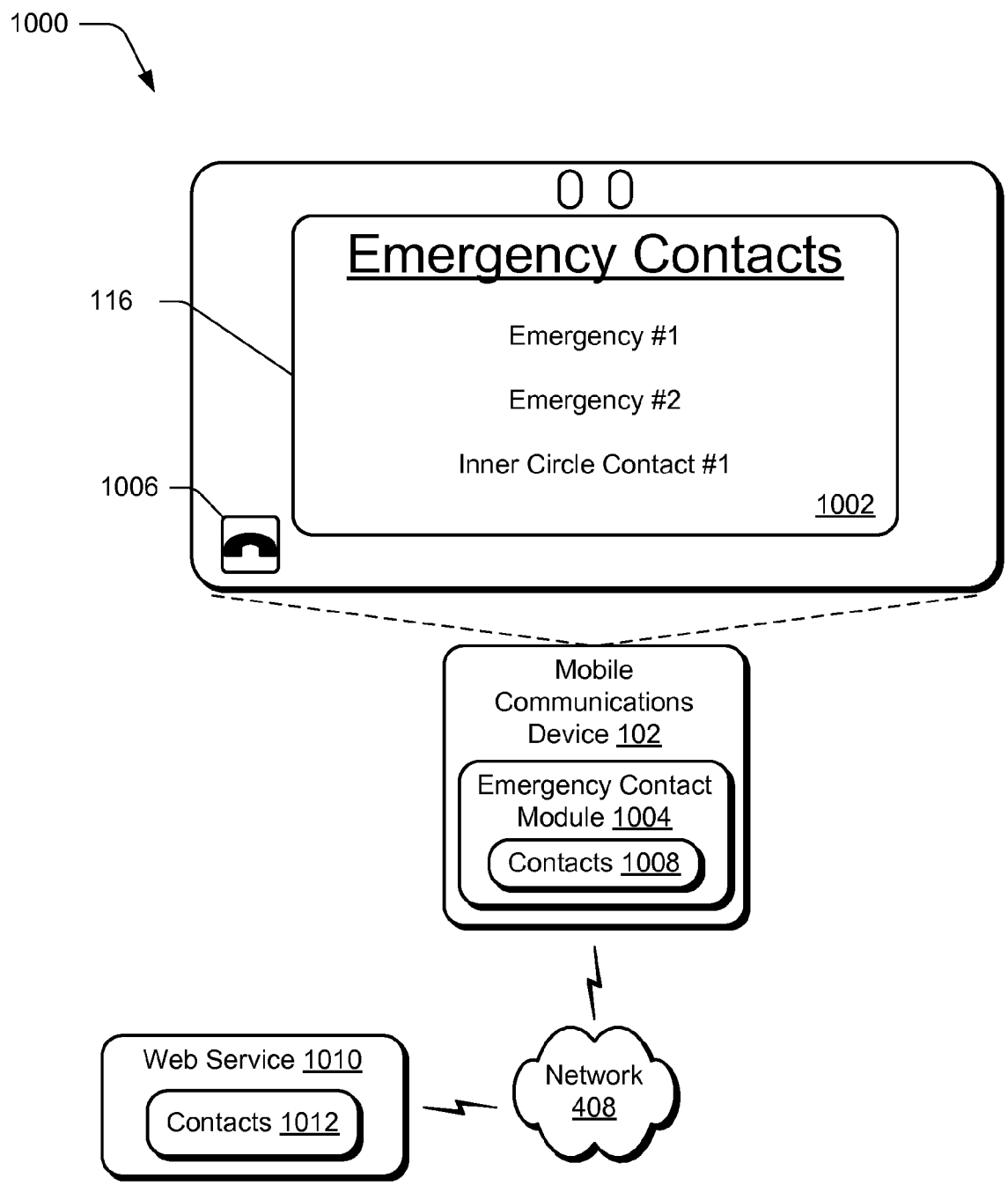
FIG. 10 illustrates an example implementation in which the mobile communications device 102 includes an emergency contact user interface.

FIG. 10 illustrates an example implementation 1000 in which the mobile communications device 102 includes an emergency contact user interface 1002. When a mobile phone is locked (either key or device locked in which is pin is utilized to unlock the phone), it is required by law to enable emergency dialing. For the most part, a PIN-lock is phone is to protect a user's data and prohibit abuse of the phone's capabilities. Accordingly, techniques are described which are useful for returning a mobile phone or other mobile communications device to the owner, may help bystanders to help an owner of the mobile communications device in an emergency situation, and expedite the process of dialing an emergency number.

Use of conventional phones on the market relay on an assumption that users know and can dial emergency numbers to call them in an emergency situation. Additionally, conventional phone restrict dialing functionality to specific emergency numbers, rather than contacts that may be able to help. Techniques are described to download locally relevant numbers and make them directly accessible to users from an emergency contact user interface 1002 if the mobile communications device 1002 is device locked (e.g., via a PIN), which may make dialing these emergency numbers easier.

Additionally, these techniques may be used to give limited access to an "inner circle" of contacts for helping a user who might not be physically capable of unlocking the device, which may also assist in recovery of a lost device-locked phone. In an implementation, this information may be displayed in the emergency contact user interface 1002 while limiting access to personal data through the device lock.

The mobile communications device 102 is illustrated as including an emergency contact module 1104, which is representative of functionality to form and output the emergency contact user interface 1002. For example, the mobile communications device 102 may be in a device lock state such that a PIN number is to be entered before access to underlying functionality of the mobile communications device 102 is permitted. In this implementation, a user may still be able to call emergency telephone numbers from the unlock screen. For example, a user may switch to emergency calling mode by pressing a call key which may be implemented as a hardware key 1006, a display of a key in a PIN entry screen configured to remove a device lock, and so on.

As illustrated, the emergency contact user interface 1002 may be output by the mobile communications device 102 to present a user with a list of contacts 1008 that may be dialed. In the illustrated implementation, emergency numbers are displayed at the top of this list, which may be updated based on the mobile communication device's 102 geographic location.

For example, a geographic location of the mobile communication device 102 may be determined by the mobile communications device 102 or other entity, such as a web service 1010. The geographic position may be determined in a variety of ways, such as through a global positing system, through use of cellular towers that are used to communicate with the mobile communications device 102, and so on. A web service 1010 may then provide contacts 1012 (e.g., emergency numbers) via the network 408 to the mobile communications device 102. In another implementation, the contacts 1012 may be stored locally by the mobile communications device 102.

The emergency contact user interface 1002 may also include "inner circle contacts," which may be listed by first name solely in alphabetical order after the emergency numbers. The inner circle contacts may be specified in a variety of ways, such as through information associated with each contact through interaction with a "wizard." If an inner circle contact has more than one telephone number, the number type may be displayed in parentheses after the name, e.g., "Mom (m)" and "Mom (h)." These contact number may also be used such that if a mobile communications device 102 is lost, a person that finds the phone may call the contact to locate the owner.

In the device locked state, selection of the representations of the contact 1008 initiates a phone call to the selected contact in limited call mode. If a user wants to access other phone functionality during the call, the user may be prompted with a PIN entry pad to enter a pin number. If a maximum number of PIN entries have already been attempted, the phone call is initiated and user may is not granted access to phone capabilities except to end the call. Although the emergency contact user interface has been described in relation to a device locked state, it should be readily apparent that this user interface may be employed in a variety of different ways, such as by a mobile communications device that is not in a locked state (e.g., by pressing a key to view emergency contacts).

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the previous sections and corresponding figures.

FIG. 11 depicts a procedure 1100 in an example implementation in which an animation is displayed in conjunction with removal of a key lock of a mobile communications device. An unlock screen 120 is displayed by a mobile communications device 102 that indicates that one or more keys of the mobile communications device 102 are locked (block 1102).

If an input at the mobile communications device 102 is detected to remove the lock, an animation is displayed that gives an appearance that the unlock screen is a page that is being turned and the lock of the one or more keys is removed (block 1104). A variety of different inputs may be detected, such as opening (e.g., via sliding) of the mobile communications device 102 as illustrated in FIG. 1, via a gesture as illustrated in FIG. 2, and so on.

FIG. 12 depicts a procedure 1200 in an example implementation in which a clock is displayed. A clock is displayed on a display device of a mobile communications device 102 in response to a waking of the display device (block 1202). For example, the mobile communications device 102 may turn the display device 116 off to conserve power after a specified amount of time has passed since the mobile communications device 102 was locked, since an input was received, and so on. The display device 116 may then be woke in response to an input, such as a press of a button by a user, movement of the mobile communications device 102, and so on.

The display of the clock is minimized after a specified amount of time has passed since the waking of the display device (block 1204). For example, the display of the clock 502 in FIG. 5 may be minimized to a corner of the display device 116 as shown in FIG. 4. Thus, in this example, the display of the clock 502 is also moved to a corner. A variety of other examples are also contemplated.

FIG. 13 depicts a procedure 1300 in an example implementation in which a condense mechanism is employed with notifications. An unlock screen 120 of a mobile communications device 102 is updated to include notifications of events that have occurred since a last time the mobile communications device 102 was locked (block 1302). A variety of different events may cause output of a notification, such as hardware (e.g., a battery low condition), software (e.g., reminders, receipt of communications), and so on.

If a number of notifications that are to be output on the unlock screen exceeds a specified number, the notifications are condensed into a single condensed notification to be output via the unlock screen that references a type and number of the notifications (block 1304). For example, the notification 716 acts to condense notifications 704-708, 712, 714 by referencing the type of notification (e.g., missed call, text message, voicemail, and so on) and a number for a respective type.

The notifications are rearranged as subsequent notifications are received if the number of the notifications that are to be output on the unlock screen does not exceed the specified number (block 1306). For example, the rearranging may be performed so that the notifications do not obscure each other, that the notifications do not obscure an image that acts as a background (e.g., wallpaper) for the unlock screen 120, and so on.

Example Mobile Communications Device

Figure 14:
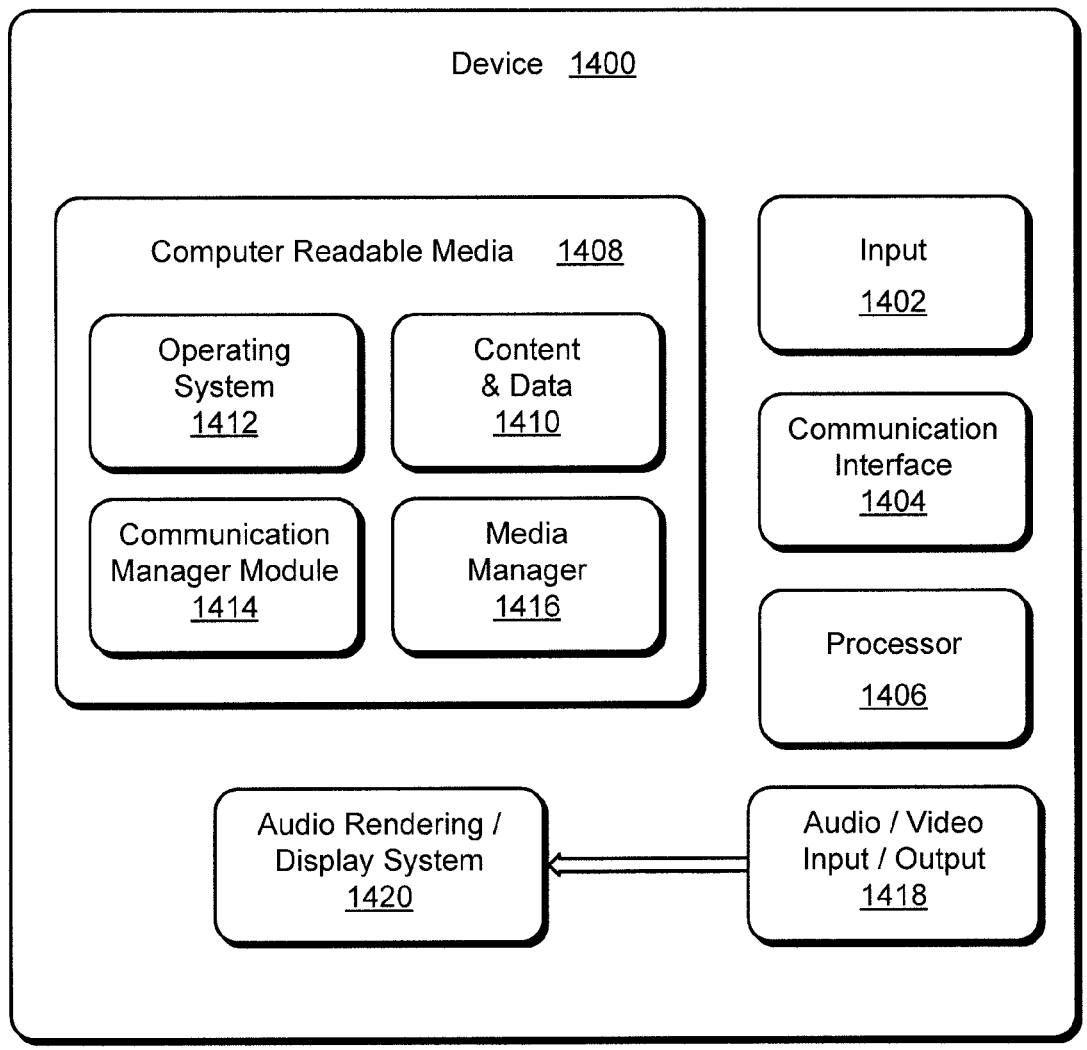
FIG. 14 illustrates various components of an example device that can be implemented in various embodiments as any type of a mobile communication device to implement embodiments of devices, features, and systems for mobile communications.

FIG. 14 illustrates various components of an example device 1400 that can be implemented in various embodiments as any type of a mobile communication device to implement embodiments of devices, features, and systems for mobile communications. For example, device 1400 can be implemented as any of the mobile communications devices 102 described with reference to respective FIGS. 1-13. Device 1400 can also be implemented to access a network-based service, such as a content service.

Device 1400 includes input(s) 1402 that may include Internet Protocol (IP) inputs. Device 1400 further includes communication interface(s) 1404 that can be implemented as any one or more of a wireless interface, any type of network interface, and as any other type of communication interface. A network interface provides a connection between device 1400 and a communication network by which other electronic and computing devices can communicate data with device 1400. A wireless interface enables device 1400 to operate as a mobile communication device for wireless communications.

Device 1400 also includes one or more processors 1406 (e.g., any of microprocessors, controllers, and the like) which process various computer-executable instructions to control the operation of device 1400 and to communicate with other electronic devices. Device 1400 can be implemented with computer-readable media 1408, such as one or more memory components, examples of which include random access memory (RAM) and non-volatile memory (e.g., any one or more of a read-only memory (ROM), flash memory, EPROM, EEPROM, etc.).

Computer-readable media 1408 provides data storage to store content and data 1410, as well as device applications and any other types of information and/or data related to operational aspects of device 1400. For example, an operating system 1412 can be maintained as a computer application with the computer-readable media 1408 and executed on processor(s) 1406. Device applications can also include a communication manager module 1414 (which may be used to provide telephonic functionality) and a media manager 1416.

Device 1400 also includes an audio and/or video output 1418 that provides audio and/or video data to an audio rendering and/or display system 1420. The audio rendering and/or display system 1420 can be implemented as integrated component(s) of the example device 1400, and can include any components that process, display, and/or otherwise render audio, video, and image data. Device 1400 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
updating an unlock screen of a mobile communications device to include notifications of events that have occurred since a last time the mobile communications device was locked; and
if a number of the notifications that are to be output on the unlock screen exceeds a specified number, condensing the notifications into a single condensed notification to be output via the unlock screen that references a type and number of the notifications.

2. A method as described in claim 1, wherein the unlock screen is output in response to initiation of a key lock of the mobile communications device.

3. A method as described in claim 1, wherein the unlock screen is output in response to initiation of a device lock of the mobile communications device that is configured to be removed using a PIN.

4. A method as described in claim 1, wherein the unlock screen is configured to be removed in conjunction with display of an animation that gives an appearance that the unlock screen is a page that is being turned.

5. A method as described in claim 1, wherein the unlock screen is configured to be removed via a gesture.

6. A method as described in claim 1, further comprising dynamically rearranging the notifications as subsequent said notifications are received if the number of the notifications that are to be output on the unlock screen does not exceed the specified number.

7. A method as described in claim 6, wherein the rearranging is performed such that the notifications do not obscure each other.

8. A method as described in claim 6, wherein the rearranging is performed such that the notifications do not obscure an image that acts as a background for the unlock screen.

9. A method as described in claim 1, wherein the updating includes displaying a particular said notification alone on the display device in response to a corresponding event and after a specified amount of time has passed, displaying the particular said notification with other said notifications if the number of the notifications that are to be output on the unlock screen does not exceed the specified number.

10. A method as described in claim 1, wherein the updating includes displaying a particular said notification alone on the display device in response to a corresponding event and after a specified amount of time has passed, performing the condensing if the number of the notifications that are to be output on the unlock screen exceeds the specified number.

11. A mobile communications device comprising a display device and one or more implemented at least partially in hardware to perform operations comprising:
updating an unlock screen displayed on the display device to include notifications of events that have occurred since a last time the mobile communications device was locked; and
if a number of the notifications that are to be output on the unlock screen exceeds a specified number, condensing the notifications into a single condensed notification to be output via the unlock screen that references a type and number of the notifications.

12. A mobile communications device as described in claim 11, wherein the unlock screen is output in response to initiation of a key lock of the mobile communications device.

13. A mobile communications device as described in claim 11, wherein the unlock screen is output in response to initiation of a device lock of the mobile communications device that is configured to be removed using a PIN.

14. A mobile communications device as described in claim 11, wherein the unlock screen is configured to be removed in conjunction with display of an animation that gives an appearance that the unlock screen is a page that is being turned.

15. A mobile communications device as described in claim 11, wherein the unlock screen is configured to be removed via a gesture.

* * * * *